(12) United States Patent
Mori (10) Patent No.: US 8,882,550 B2
(45) Date of Patent: Nov. 11, 2014

(54) SHIP PROPULSION DEVICE

(75) Inventor: Hisanori Mori, Amagasaki (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/814,516

(22) PCT Filed: Oct. 13, 2011

(86) PCT No.: PCT/JP2011/073537
§ 371 (c)(1),
(2), (4) Date: Feb. 6, 2013

(87) PCT Pub. No.: WO2012/056894
PCT Pub. Date: May 3, 2012

(65) Prior Publication Data
US 2013/0172149 A1   Jul. 4, 2013

(30) Foreign Application Priority Data

Oct. 27, 2010   (JP) .................................. 2010-241233

(51) Int. Cl.
| | | |
|---|---|---|
| *B63H 21/22* | (2006.01) | |
| *B60W 10/04* | (2006.01) | |
| *F16D 25/0638* | (2006.01) | |
| *B63H 23/30* | (2006.01) | |
| *F02D 29/02* | (2006.01) | |
| *F16D 48/08* | (2006.01) | |
| *F16D 25/12* | (2006.01) | |
| *B63H 21/21* | (2006.01) | |

(52) U.S. Cl.
CPC .......... *B63H 23/30* (2013.01); *B63H 2021/216* (2013.01); *F16D 25/0638* (2013.01); *B63H 21/21* (2013.01); *F16D 2500/70426* (2013.01); *F16D 2500/3067* (2013.01); *F02D 29/02* (2013.01); *F16D 48/08* (2013.01); *F16D 25/123* (2013.01)
USPC .............................................. 440/1; 477/112

(58) Field of Classification Search
CPC .. B63H 23/30; B63H 2021/216; B63H 21/21; B63J 3/02; F16D 2500/3067; F16D 48/02
USPC ........................................................ 440/1, 87
See application file for complete search history.

(56) References Cited

U.S. PATENT DOCUMENTS 5,336,120 A *   8/1994   Maurer et al. .................. 440/84
6,443,286 B1 *   9/2002   Bratel et al. ............... 192/85.32

(Continued)

FOREIGN PATENT DOCUMENTS

| JP | 02-51623 A | 2/1990 |
| JP | 2003-2296 A | 1/2003 |
| JP | 2009-202778 A | 9/2009 |

OTHER PUBLICATIONS

International Search Report of the International Searching Authority mailed Jan. 24, 2012 for the corresponding international application No. PCT/JP2011/073537 (with English translation).

*Primary Examiner* — Dirk Wright
(74) *Attorney, Agent, or Firm* — Posz Law Group, PLC (57) ABSTRACT

A ship propulsion device is configured so that a control device operates an engine at a first engine speed when a clutch is in a disengaged state; so that, based on the input of an input device, the control device changes the state of the clutch from the disengaged state to a partially engaged state and operates the engine at a second engine speed that is higher than the first engine speed; so that, based on the detection of a rotational speed detection device, the control device operates the engine at an engine speed that is lower than the second engine speed; and so that, based on the input of an input device, the control device changes the state of the clutch from the partially engaged state to an engaged state.

6 Claims, 10 Drawing Sheets

(56) References Cited

U.S. PATENT DOCUMENTS

| | | | |
|---|---|---|---|
| 7,938,703 B2 * | 5/2011 | Mizokawa | 440/1 |
| 7,996,123 B2 * | 8/2011 | Henkner | 701/21 |
| 8,011,984 B2 * | 9/2011 | Suzuki et al. | 440/86 |
| 8,019,498 B2 * | 9/2011 | Yamazaki et al. | 701/21 |
| 8,078,347 B2 * | 12/2011 | Minoura | 701/21 |
| 8,277,268 B2 * | 10/2012 | Misao | 440/75 |
| 8,521,348 B1 * | 8/2013 | Walser et al. | 701/21 |
| 2009/0221194 A1 | 9/2009 | Suzuki et al. | |
| 2009/0299556 A1 * | 12/2009 | Henkner | 701/21 |

* cited by examiner fig. 1 fig. 2

(a)

← oil pressure (b)

SHIP PROPULSION DEVICE

CROSS REFERENCE TO RELATED APPLICATIONS

This application is a U.S. national stage application of PCT/JP2011/073537 filed on Oct. 13, 2011, and claims priority to, and incorporates by reference, Japanese Patent Application No. 2010-241233 filed on Oct. 27, 2010.

TECHNICAL FIELD

The present invention relates to a ship propulsion device for propelling a ship.

BACKGROUND ART

Figure 10:
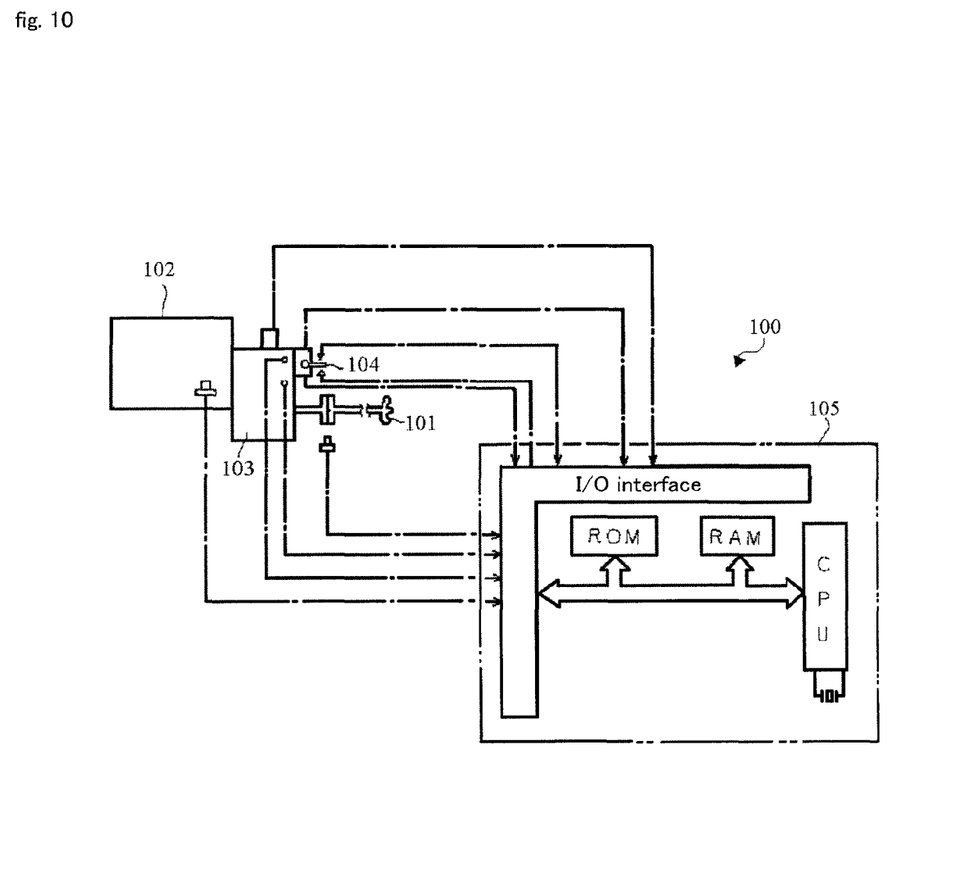
FIG. 10 schematically illustrates the construction of a known ship propulsion device.

The ship propulsion device disclosed in Patent Literature 1 is conventionally known as a ship propulsion device for propelling a ship. FIG. 10 schematically illustrates the construction of a known ship propulsion device. As shown in FIG. 10, the ship propulsion device 100 comprises a propeller 101 for propelling a ship, an engine 102 for rotating the propeller 101, and a reduction/reversing gear 103 that is capable of transmitting the revolutions of the engine 102 to the propeller 101. The reduction/reversing gear 103 is provided with a clutch (not shown) inside. The ship propulsion device 100 comprises an input device 104 that is capable of inputting value that indicates the state of the clutch inside the reduction/reversing gear 103, and a control device 105 that controls the state of the clutch and the operation of the engine 102.

When a ship is propelled using a ship propulsion device 100 having such a structure, as a first step, with the clutch mounted in the reduction/reversing gear 103 disengaged, the control device 105 allows the engine 102 to start when a switch (not shown) is turned on. Next, while the engine 102 is operating, the control device 105 puts the clutch in the reduction/reversing gear 103 into a partially engaged state based on input of the input device 104. This allows the revolutions of the engine 102 to be transmitted to the propeller 101 through the clutch in the reduction/reversing gear 103, causing the propeller 101 to start rotating. Thereafter, with the engine 102 operating and the clutch in a partially engaged state, the control device 105 puts the clutch into an engaged state based on input of the input device 104. This completely connects the clutch, so that the revolutions of the engine 102 are fully transmitted to the propeller 101 through the clutch. As a result, the propeller 101 fully rotates. Thus, by bringing the clutch in the reduction/reversing gear 103 from a disengaged state to an engaged state via a partially engaged state, the propeller 101 can be rotated, thereby propelling the ship.

CITATION LIST

Patent Literature

Patent Literature 1: JP2003-2296A

SUMMARY OF INVENTION

Technical Problem

In the ship propulsion device 100 having the structure described above, when the clutch in the reduction/reversing gear 103 is switched from the partially engaged state to the engaged state, the rotational speed of the propeller 101 sometimes rapidly increases. This is because, when the clutch in the reduction/reversing gear 103 is in a partially engaged state, the revolutions of the engine 102 are partially transmitted to the propeller 101, i.e., the revolutions of the engine 102 are not fully transmitted to the propeller 101. Therefore, compared to the case where the clutch is in an engaged state, the propeller 101 rotates at a lower speed. However, near the boundary of the partially engaged state and the engaged state, a partially engaged state cannot be stably attained. This sometimes causes a sudden increase in the rotational speed of the propeller 101 near the boundary. As a result, it has been difficult to smoothly control the rotational speed of the propeller 101 and to smoothly change the speed of the ship. There was thus room for improvement in this respect.

The present invention aims to solve the problems described above. An object of the present invention is to provide a ship propulsion device that can smoothly control the speed of a ship.

Solution to Problem

The present invention relates to a ship propulsion device to solve the above problems. Specifically, the ship propulsion device of the present invention comprises a propeller for propelling a ship; an engine for rotating the propeller; a clutch that is capable of transmitting the revolutions of the engine to the propeller; an input means that is capable of inputting the state of the clutch; a rotational speed detection means for detecting the rotational speed of the propeller; a control means for controlling the operation of the engine and the state of the clutch, wherein the control means operates the engine at a first engine speed when the clutch is in a disengaged state; the control means, based on the input of the input means, changes the state of the clutch from the disengaged state to a partially engaged state and operates the engine at a second engine speed that is higher than the first engine speed; the control means, based on detection of the rotational speed detection means, operates the engine at an engine speed that is lower than the second engine speed; and the control means, based on the input of the input means, changes the state of the clutch from the partially engaged state to an engaged state.

In this construction, because the number of revolutions of the engine (i.e., engine speed) is changed to a second engine speed that is higher than the first engine speed while the clutch is in the partially engaged state, the rotational speed of the propeller in the partially engaged state can be increased. Here, the engine speed is changed to be smaller than that of the second engine speed and the state of the clutch is changed from the partially engaged state to the engaged state after the rotational speed of the propeller have once been increased; therefore, the rotational speed of the propeller in the partially engaged state can be made close to the rotational speed of the propeller in the engaged state. In other words, if the clutch were put into the engaged state without once increasing the engine speed, the rotational speed of the propeller would unexpectedly and rapidly increase when the clutch was switched from the partially engaged state to the engaged state, causing a rapid change in the speed of the ship. However, according to the present invention, when the clutch is switched from the partially engaged state to the engaged state, the rotational speed of the propeller in the two states can be made close. This prevents a rapid and momentary increase in the rotational speed of the propeller. As a result, the rotational speed of the propeller smoothly increases and, therefore, the speed of the ship can be smoothly controlled. This construction is particularly beneficial when a ship is positioned at a fixed point offshore or halted at the shore, because the ship employs the partially engaged state of the clutch in such situations.

In the conventional structure, as described in Patent Literature 1, the rotational speed of the propeller is controlled by regulating the oil pressure of the clutch. However, because the engine speed, on which the rotational speed of the propeller depends, is not increased in this structure, there was a limitation to increasing the rotational speed of the propeller. In view of the above problems, the present inventors found that the rotational speed of the propeller is increased by increasing the engine speed under a state where the clutch is partially engaged. Because the targets to be controlled differ, it was not easy to apply this finding, i.e., that the rotational speed of the propeller is increased by increasing the engine speed only under a state where the clutch is partially engaged, to the structure disclosed in Patent Literature 1, wherein the rotational speed of the propeller is controlled by regulating the oil pressure of the clutch. The present invention has been accomplished based on findings such as this.

In the ship propulsion device described above, the control means returns the speed of the engine from the second engine speed to the first engine speed based on the detection of the rotational speed detection means.

Advantageous Effects of Invention

The ship propulsion device of the present invention allows a ship to start smoothly.

DESCRIPTION OF EMBODIMENTS

Figure 1:
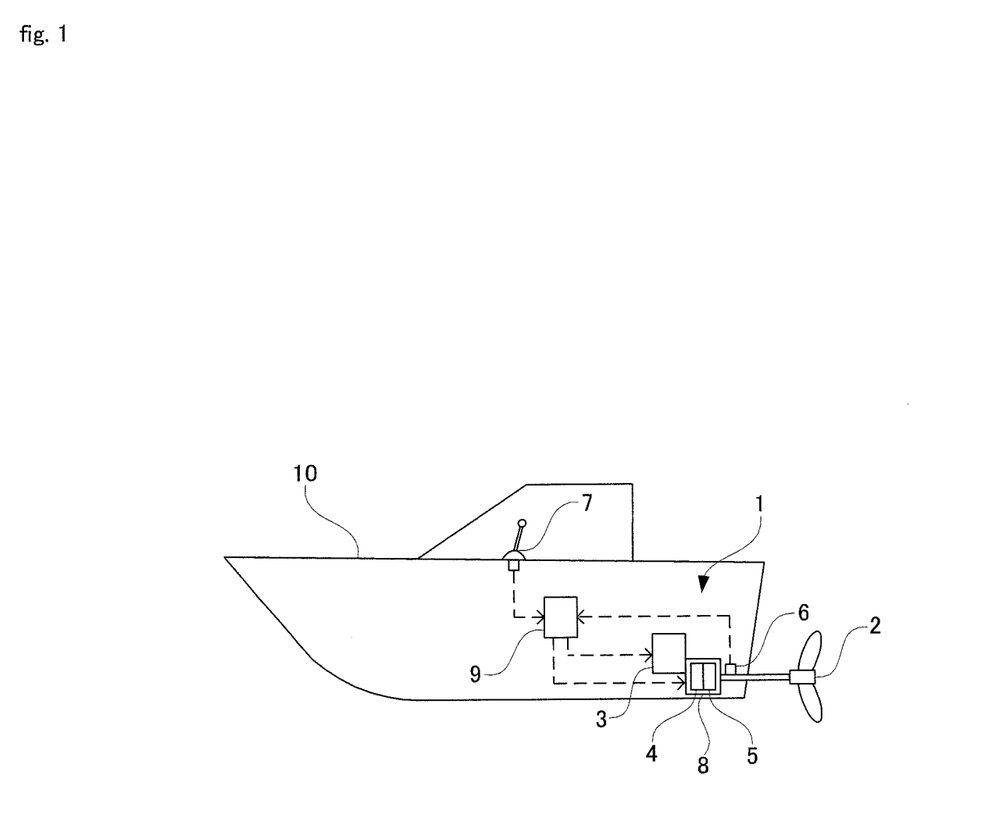
FIG. 1 is a general view of the ship propulsion device according to one embodiment of the present invention.

Hereafter, an embodiment of the present invention is described with reference to accompanying drawings. FIG. 1 is a general view of the ship propulsion device according to one embodiment of the present invention. As shown in FIG. 1, the ship propulsion device 1 is mounted in a ship 10. The ship propulsion device 1 is provided with a propeller 2 for propelling the ship 10, an engine 3 for rotating the propeller 2, a reduction/reversing gear 8 comprising a clutch 4 and transmission 5 that are capable of transmitting the revolutions of the engine 3 to the propeller 2, and a rotational speed detection device 6 for detecting the rotational speed of the propeller 2. The ship propulsion device 1 further comprises an input device 7 that is capable of inputting the states of the clutch 4 and transmission 5. The ship propulsion device 1 also comprises a control device 9 for controlling the operation of the engine 3, and the states of the clutch 4 and the transmission 5.

The ship 10 is a publicly known boat, cruiser, or the like, which sails while carrying people and/or objects. The propeller 2 comprises a propeller drive shaft extending backward from the stern of the ship 10, and a plurality of impeller blades radially fixed to the rear end part of the propeller drive shaft in the axial direction. The ship 10 can be moved forward or backward by the propulsive force attributable to the propeller rotation. The engine 3 is not particularly limited as long as it can generate rotational driving force, and a known engine used for common ships can be employed. The engine 3 can rotate a drive shaft 40, which is not shown in FIG. 1 and will be described later. The engine 3 is structured so that its number of revolutions (operating speed) can be varied by electrical control and the like.

A known rotary power transmission device that intermittently transmits the rotations from one shaft to another can be used as the clutch 4. In the present embodiment, a known friction clutch that transmits rotations using the friction force generated between opposing friction plates is used as the clutch 4. Here, by adjusting the distance between the opposing friction plates by increasing or decreasing the oil pressure, the plates can be mutually switched to a disengaged state, a partially engaged state, or an engaged state. The disengaged state indicates the condition where the opposing friction plates are separated from each other and the rotational force of one shaft is not transmitted to another shaft. The partially engaged state indicates a condition between the disengaged state and the engaged state, wherein the opposing friction plates are connected while slipping against each other and only a portion of the rotational force of one shaft is transmitted to another shaft. The engaged state indicates the condition where the opposing friction plates are connected to each other and the entire rotational force of one shaft is transmitted to another shaft.

Figure 2:
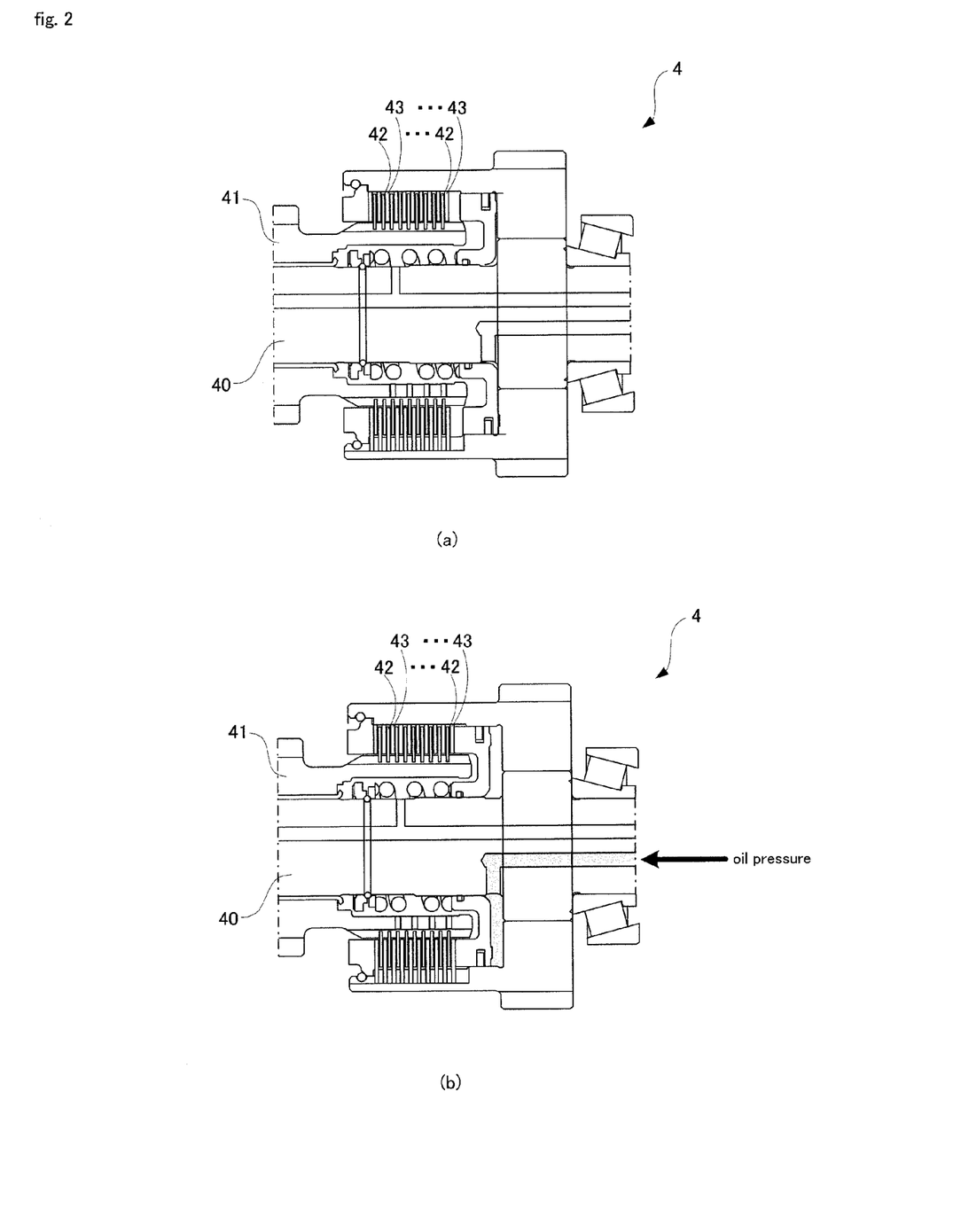
FIG. 2 schematically illustrates the construction of the clutch, wherein (a) shows a disengaged state and (b) shows an engaged state.

FIG. 2 is a diagram schematically illustrating a clutch. FIG. 2(a) shows the disengaged state and FIG. 2(b) shows the engaged state. As shown in FIG. 2, the clutch 4 comprises a drive shaft 40 and a driven shaft 41 arranged so as to extend in the same direction; a plurality of drive friction plates 42 connected to the drive shaft 40; and a plurality of driven friction plates 43 connected to the driven shaft 41. The drive shaft 40 is connected to the engine 3. The drive shaft 40 rotates due to the rotational driving force of the engine 3 and causes the drive friction plates 42 to be rotated. In the disengaged state shown in FIG. 2(a), the drive friction plates 42 are separated from the driven friction plates 43; therefore, the drive friction plates 42 do not transmit rotation to the driven friction plates 43. In the engaged state shown in FIG. 2(b), the drive friction plates 42 are in contact with the driven friction plates 43 and transmit the entire rotational force to the driven friction plates 43. In the partially engaged state, which is between the disengaged state and the engaged state, the drive friction plates 42 transmit a portion of the rotational force to the driven friction plates 43 through transmission oil (not shown) while slipping. The driven friction plates 43 rotate due to the rotation transmitted from the drive friction plates 42, causing the driven shaft 41 to be rotated. The driven shaft 41 is connected to the propeller 2 via a gear or the like and is structured so that the propeller 2 is rotated due to the rotation of the driven shaft 41.

Switching to the disengaged state, the partially engaged state, or the engaged state can be performed by controlling the oil pressure of an oil-hydraulic pump (not shown) using the control device 9.

It is possible to use, as the transmission 5, a known transmission that transmits the rotation of one shaft to another shaft via a plurality of gears while changing the number of rotations (rotational speed) thereof. The transmission 5 is structured so that it can transmit the revolutions of the engine 3 to the propeller 2 while changing the revolutions by adjusting the speed reduction ratio (or gear ratio). The transmission 5 can also change the rotational direction of the propeller 2, i.e., to the forward or reverse direction, by switching gears. The transmission 5 is structured so as to be able to change the direction of the ship 10 to the forward or reverse direction by the mechanism described above. The forward/reverse direction is changed by using the control device 9 to control the oil pressure of the oil-hydraulic pump (not shown).

The rotational speed detection device 6 is located in the vicinity of the drive shaft of the propeller 2 so as to be able to detect the rotational speed of the propeller 2. As the rotational speed detection device 6, for example, a known tachometer that uses pulse signals to measure the rotational speed can be used. The detection results of the rotational speed detection device 6 are sent to the control device 9.

Figure 3:
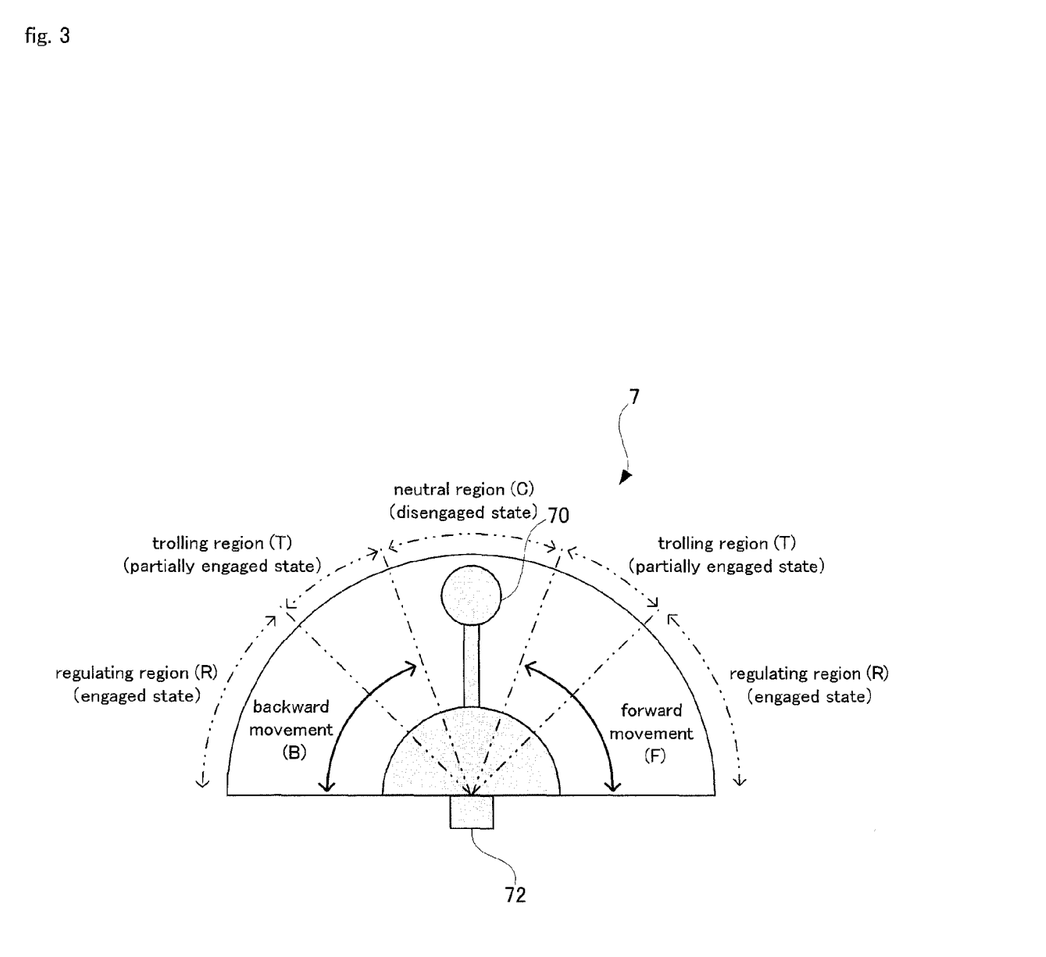
FIG. 3 schematically illustrates the construction of the input device.

FIG. 3 schematically illustrates the structure of the input device. As shown in FIG. 3, the input device 7 comprises a lever 70 that is tiltable in the horizontal direction of FIG. 3, and a lever angle detection device 72 for detecting the tilt angle of the lever 70. FIG. 3 shows, behind the lever 70, the states of the clutch 4 and the transmission 51 corresponding to the tilting of the lever 70.

The lever 70 is tiltable in the horizontal direction (i.e., left and right), having a base as its pivotal center, and can switch the states of the clutch 4 and transmission 5 in accordance with the tilting angle thereof. Note that the front and rear, right and left directions are defined in FIG. 3 only to facilitate the explanation; therefore, they do not limit the operating directions of the present invention.

The clutch 4 may be in a disengaged state, a partially engaged state, or an engaged state. These three states are defined as a neutral region (C), a trolling region (T), and a regulating region (R), respectively. The neutral region (C) is allotted at the substantially central portion of FIG. 3, each trolling region (T) is allotted at the left or right side of the neutral region (C), and each regulating region (R) is allotted at the left or right side of each trolling region (T). The transmission 5 may be in a forward (F) or reverse (B) condition. These conditions are divided into the left and right regions in FIG. 3.

The lever angle detection device 72 is structured so as to detect the input value from the input device 7 for the clutch 4 and transmission 5 by detecting the tilting (inclination) angle of the lever 70. A known gyroscope or resistor can be used as the lever angle detection device 72. The detection results of the lever angle detection device 72 are sent to the control device 9.

The input device 7 is preset so that when the lever 70 is held in the neutral region (C), the clutch 4 will be in the disengaged state; when the lever 70 is tilted and held in a trolling region (T), the clutch 4 will be in the partially engaged state; and when the lever 70 is further tilted and held in a regulating region (R), the clutch 4 will be in the engaged state. Furthermore, the input device 7 is designed so that when the lever 70 is tilted rightward, the gears of the transmission 5 will mesh with each other in such a manner that the ship 10 moves forward, and when the lever 70 is tilted leftward, the gears of the transmission 5 will mesh with each other in such a manner that the ship 10 moves backward. When the lever angle detection device 72 detects the tilt angle of the lever 70, each state described above corresponding to the lever angle is detected. For example, if the trolling region (T) is allocated in the range of 30° to 45° relative to the perpendicular direction and the lever 70 is tilted by 35°, the lever angle detection device 72 detects the lever angle so that the input value of the partially engaged state corresponding to the trolling region (T) can be detected. This detection result is sent to the control device 9 as the input value of the input device 7.

Figure 4:
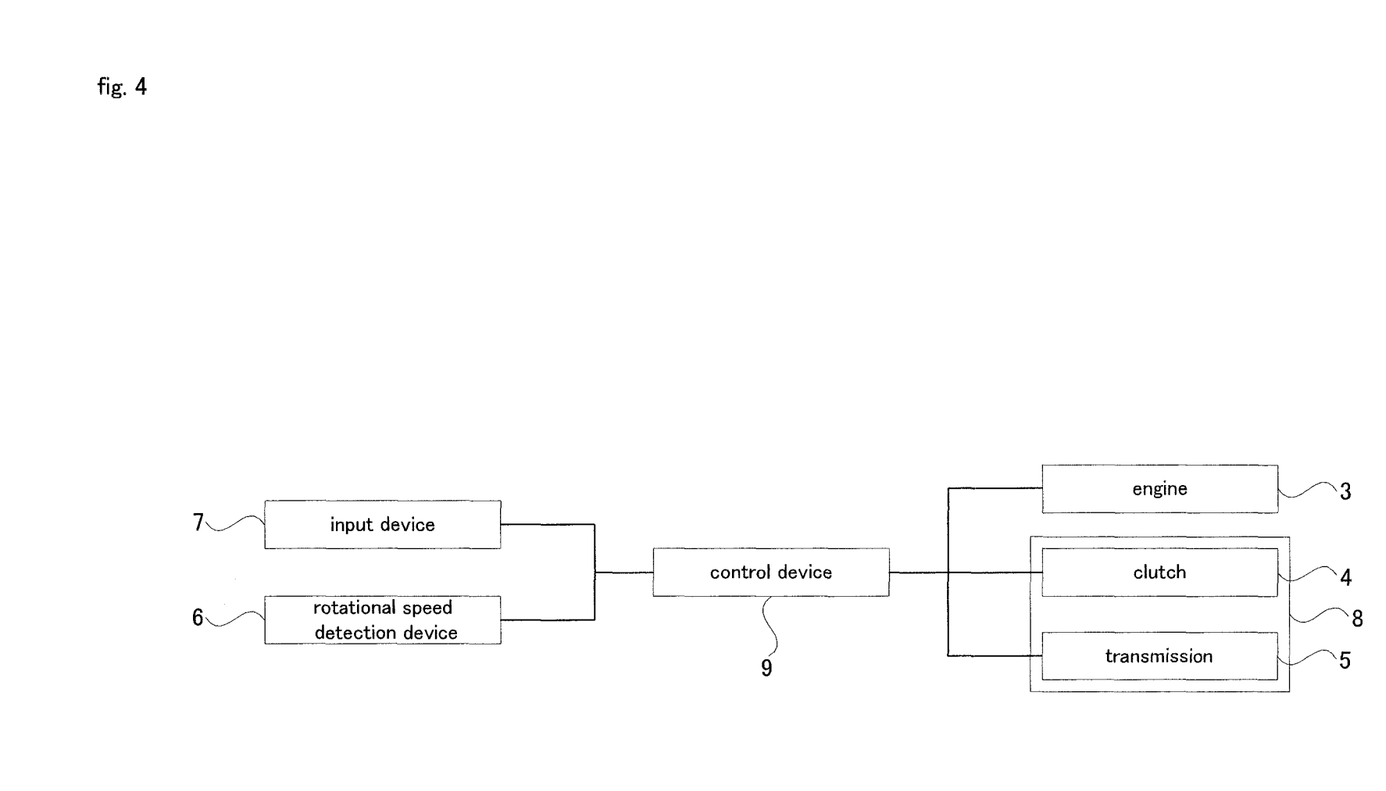
FIG. 4 is a block diagram of the ship propulsion device.

FIG. 4 is a block diagram of the ship propulsion device according to one embodiment of the invention. As shown in FIG. 4, the control device 9 is structured so as to be capable of controlling, based on the input of the input device 7, the states of the clutch 4 and transmission 5 in the reduction/reversing gear 8, and the operation of the engine 3. The control device 9 is also constructed so that, based on the detection of the rotational speed detection device 6, the state of the clutch 4 and the operation of the engine 3 can be controlled.

Figure 5:
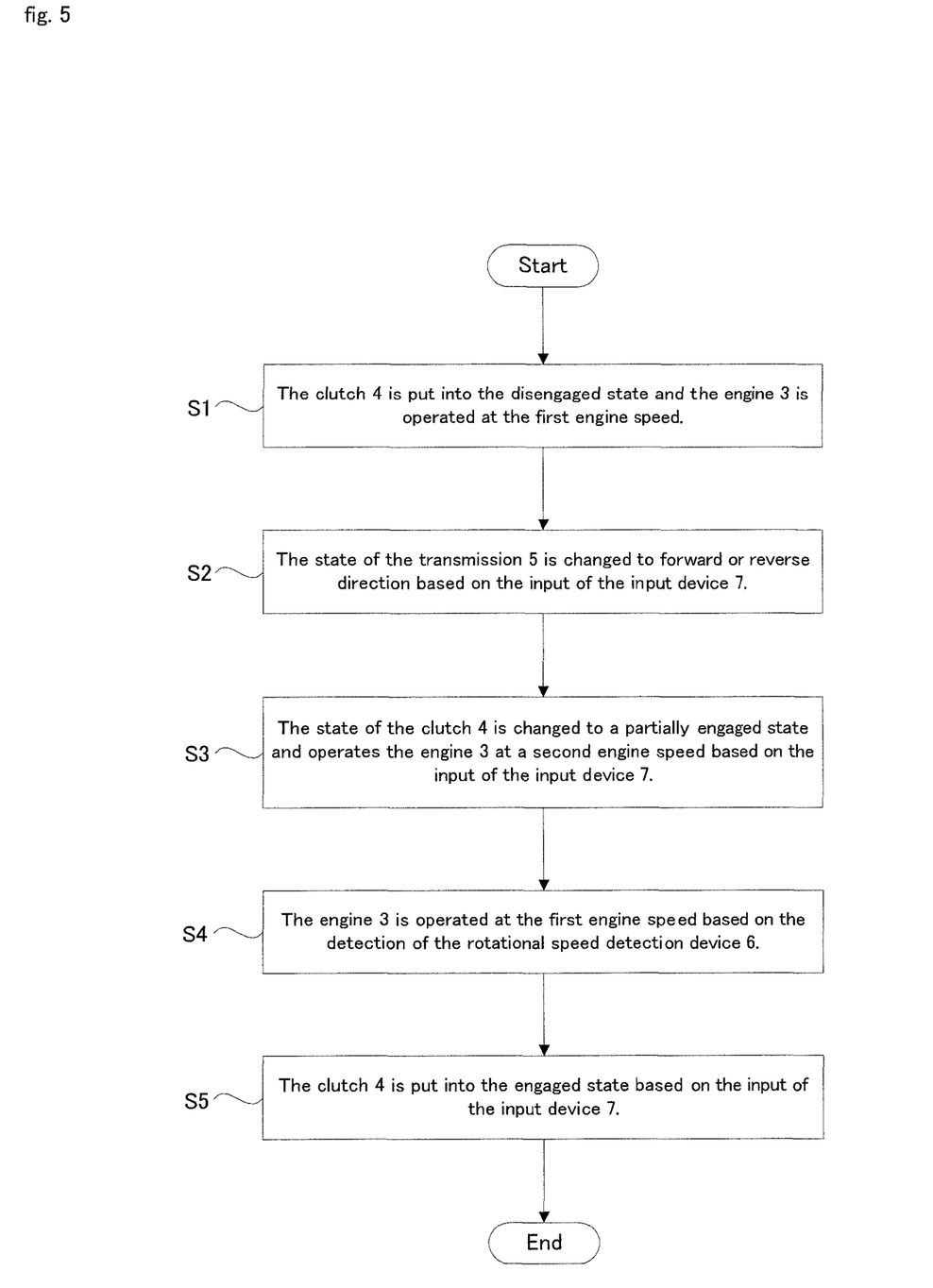
FIG. 5 is a flowchart showing the operation of the ship propulsion device.

A method for propelling the ship 10 using the ship propulsion device 1 having the above structure is explained below. FIG. 5 is a flowchart showing the operation of the ship propulsion device.

As shown in FIG. 5, when the ship 1 is to be propelled, the clutch 4 is, first, put into the disengaged state and the engine 3 is operated at the first engine speed. Specifically, the clutch 4 is put into the disengaged state by holding the lever 70 of the input device 7 in the neutral region (C). When a switch (not shown) is turned on, the control device 9 starts the engine 3 operation (Step S1). At this time, the engine 3 operates in an idle state at the minimum engine revolution (speed). In the present embodiment, the engine speed in the idle state is defined as the first engine speed. The first engine speed is, for example, 500 rpm.

Subsequently, value is input by the input device 7. More specifically, the lever 70 of the input device 7 is tilted from the neutral region (C). In order to move the ship 10 forward, the lever 70 is tilted rightward in FIG. 3. To move the ship 10 backward, the lever 70 is tilted leftward. When the lever 70 is tilted, the lever angle detection device 72 detects the tilt angle (lever angle), and sends the detection result to the control device 9 as the input value of the input device 7. Upon receiving the input value of the input device 7, the control device 9 determines whether the input value indicates forward or reverse movement, and, based on this determination, switches the state of the transmission 5 to forward or reverse by controlling the oil pressure (Step S2). In the present embodiment, when the lever 70 is tilted rightward, the control device 9 changes the gears of the transmission 5 to the forward position based on the input value (lever angle), and when the lever 70 is tilted leftward, it changes the gears to the reverse position.

Figure 6:
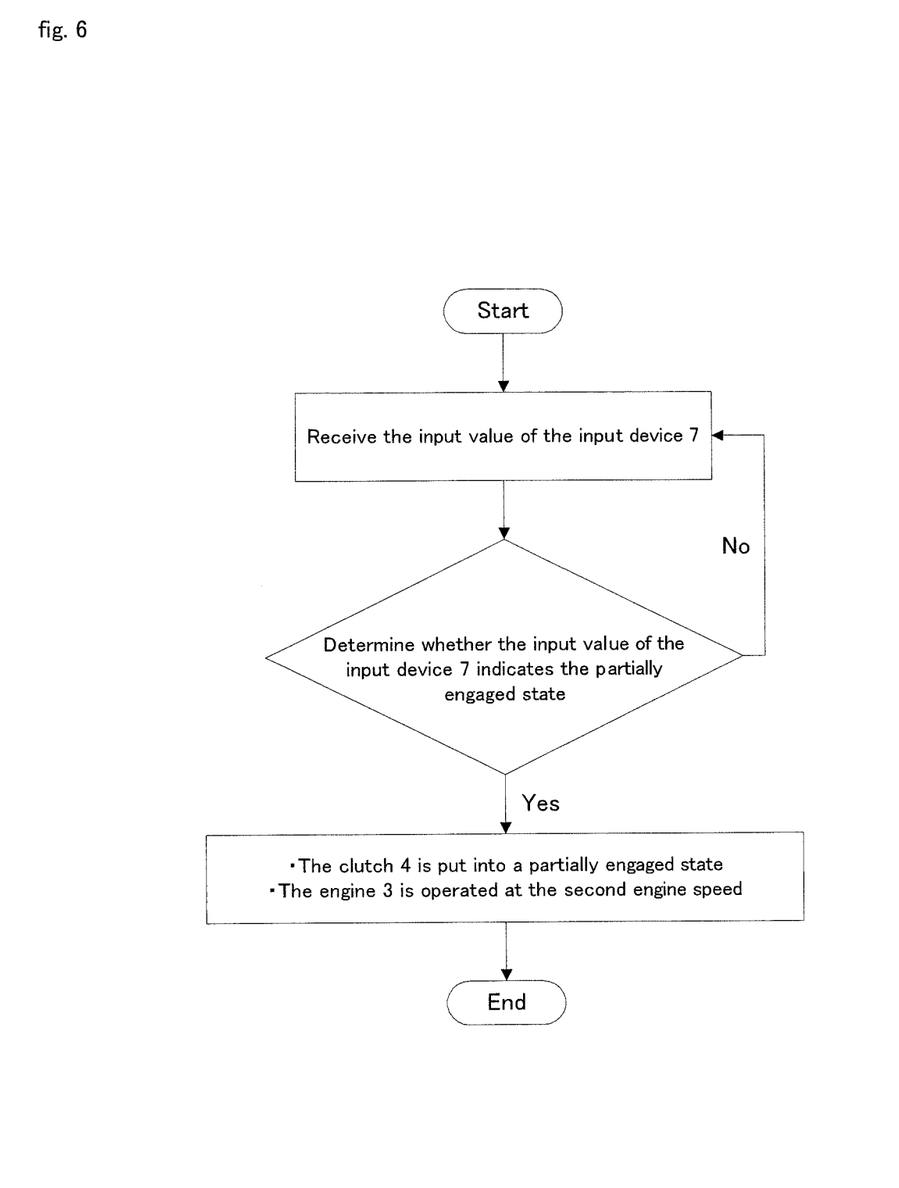
FIG. 6 is a flowchart showing part of the operation of the ship propulsion device.

As shown in FIG. 6, when the control device 9 receives the input value of the input device 7, it determines whether the input value indicates the partially engaged state. When the input value indicates the partially engaged state, the control device 9 switches the state of the clutch 4 from the disengaged state to the partially engaged state by controlling the oil pressure. In the present embodiment, when the lever 70 is tilted to the trolling region (T), the lever angle at this location is determined to be the input value that indicates the partially engaged state. Based on this input value, the control device 9 puts the clutch 4 into a partially engaged state. Here, the control device 9 puts the clutch 4 into a partially engaged state and, at the same time, changes the engine speed 3 from the first engine speed to the second engine speed. The second engine speed can be preset and is greater than that of the first engine speed. For example, when a reduction/reversing gear 8 provided with a clutch 4 has a speed reduction ratio (gear ratio) of 1.0 and a first engine speed of 500 rpm, when the rotational speed of the propeller cannot be stably attained near the boundary of the engaged state and the partially engaged state (i.e., 450 to 500 rpm with a slip ratio of 0 to 10%) as described above, the second engine speed shall be about 560 rpm. In such a case, at the second engine speed, even if the 0 to 10% slip ratio is assumed to be unstable, the partially engaged state will be stably attained up to 504 rpm (=560×0.9).

Therefore, when the lever 70 reaches the trolling region (T) and the input value of the input device 7 indicates the partially engaged state, the clutch 4 is put into the partially engaged state by the control of the control device 9, and the engine 3 operates at the second engine speed (Step S3). When the clutch 4 enters the partially engaged state, the rotational force of the engine 3 is transmitted to the propeller 2 through the clutch 4, causing the propeller 2 to start rotating.

Figure 7:
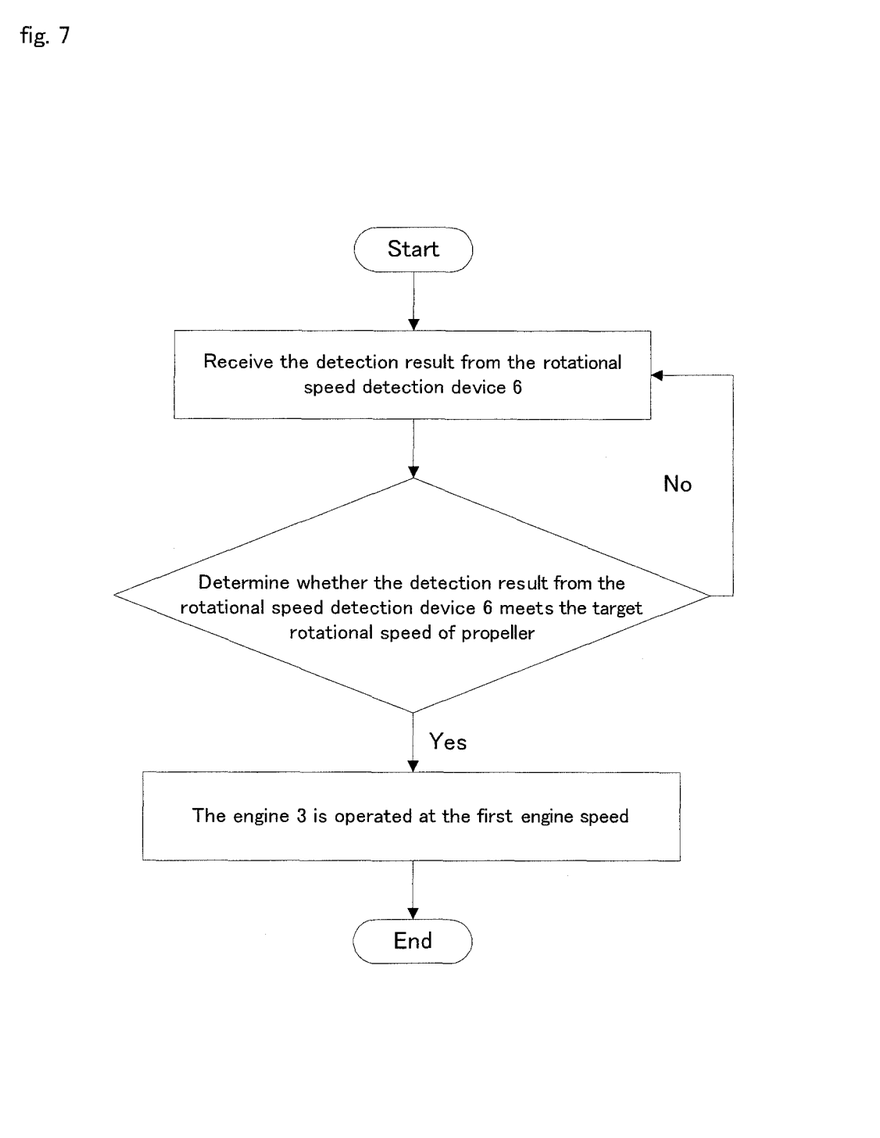
FIG. 7 is a flowchart showing another part of the operation of the ship propulsion device.

Thereafter, value is sequentially input by the input device 7. More specifically, the lever 70 of the input device 7 is further tilted into the trolling region (T). This increases the tilt angle of the lever 70. Accordingly, the control device 9 brings the drive friction plates 42 and the driven friction plates 43 of the clutch 4 closer together by oil pressure. As a result, the slip ratio of the clutch 4 gradually decreases, and the engine 3 revolutions can be transmitted more reliably to the propeller 2. This gradually increases the rotational speed of the propeller 2. At this time, the rotational speed of the propeller 2 is detected by the rotational speed detection device 6, and the detection result is sent to the control device 9. As shown in FIG. 7, upon receiving the detection result from the rotational speed detection device 6, the control device 9 determines whether the detection result meets the target rotational speed of propeller. When the rotational speed of the propeller 2 reaches the target value, the control device 9 changes the speed of the engine 3 to return from the second engine speed to the first engine speed described above (Step S4). Here, the target rotational speed of propeller can be suitably selected; however, the target rotational speed is preferably the same as that of the propeller 2 when the clutch 4 is in the engaged state at the first engine speed. For example, if the rotational speed of the propeller 2 is 500 rpm when the clutch 4 is in the engaged state, the target rotational speed of propeller is preferably set to 500 rpm.

Thereafter, when the lever 70 of the input device 7 is tilted, the tilt angle of the lever 70 is detected by the lever angle detection device 72, and the detection result is then sent to the control device 9 as the input value of the input device 7. Upon receiving the input value of the input device 7, the control device 9 determines whether the input value indicates the engaged state of the clutch 4. If the value indicates the engaged state, the control device 9 switches the state of the clutch 4 from the partially engaged state to the engaged state by controlling the oil pressure (Step S5). In the present embodiment, when the lever 70 is tilted into the regulating region (R), the lever angle at this location is determined to be the input value that indicates the engaged state. Based on this input value, the control device 9 puts the clutch 4 into the engaged state. When the clutch 4 is in the engaged state, the entire rotational force of the engine 3 is transmitted to the propeller 2 through the clutch 4, fully rotating the propeller 2.

As described above, by both changing the engine speed and switching from the partially engaged state to the engaged state, the rotational speed of the propeller can be changed almost linearly depending on the tilt angle of the lever 70. As a result, the speed of the ship 10 can be smoothly controlled.

Note that the engine speed is returned from the second engine speed to the first engine speed near the boundary of the trolling region (T) and the regulating region (R) shown in FIG. 3; therefore, the engine operates at the second engine speed in substantially the entire trolling region (T).

Thereafter, when the clutch 4 is put in the engaged state, the entire rotational force of the engine 3 is transmitted to the propeller 2 through the clutch 4, allowing the propeller 2 to fully rotate. At this time, the rotational speed of the propeller is, for example, 500 rpm.

Figure 8:
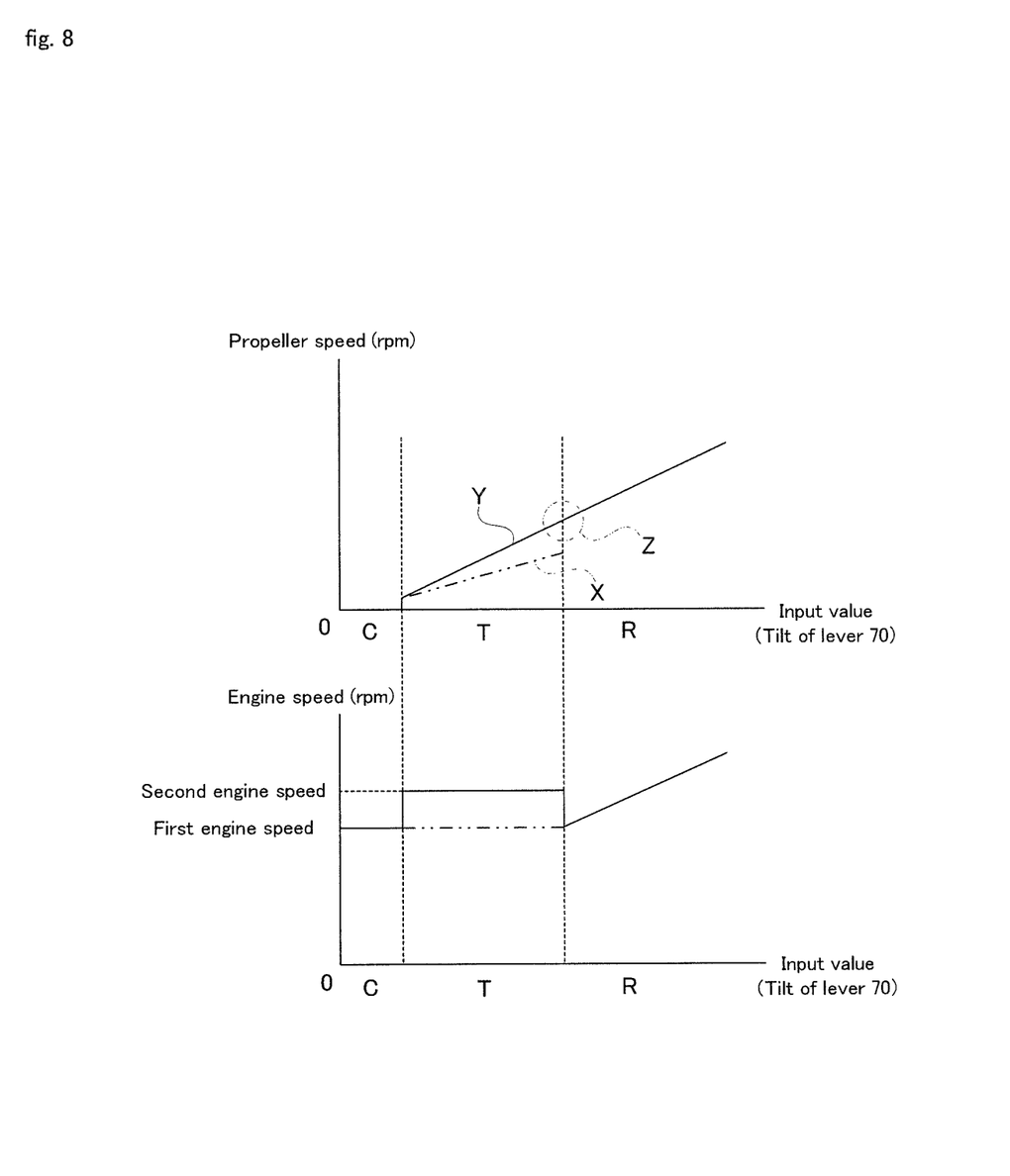
FIG. 8 shows graphs indicating the results of the operation of the ship propulsion device.

The ship propulsion device 1 of the present invention propels the ship 10 by rotating the propeller 2 as described above. According to such a ship propulsion device 1, when the clutch 4 is in the partially engaged state, the engine speed 3 is set to the second engine speed, which is higher than the first engine speed, so the rotational speed of the propeller 2 can be increased in the stable partially engaged state (trolling region T). Then, after once increasing the rotational speed of the propeller, the engine speed 3 is made smaller than that of the second engine speed and the clutch (4) is changed from the partially engaged state to the engaged state, so the rotational speed of the propeller in the partially engaged state and the rotational speed of the propeller in the engaged state can be made close. More specifically, as shown in FIG. 8, when the lever 70 is tilted into the trolling region (T), i.e., when the clutch 4 enters the partially engaged state, if the speed of the engine 3 is maintained at the first engine speed without being changed, the rotational speed of the propeller 2 will not greatly increase, as shown by reference symbol X in the figure. In contrast, when the engine speed 3 is increased from the first engine speed to the second engine speed, as shown by reference symbol Y in the figure, the rotational speed of the propeller 2 increases. When the clutch 4 changes from the partially engaged state to the engaged state (i.e., when the lever 70 is tilted from the trolling region (T) to the regulating region (R)), as shown by reference symbol Z, the rotational speed of the propeller in the partially engaged state and that in the engaged state can be made very close. This prevents a sudden increase in the rotational speed of the propeller when the clutch 4 is changed. As a result, the rotational speed of the propeller increases smoothly so the ship 10 can be smoothly started.

One embodiment of the present invention is described above; however, the concrete embodiments of the present invention are not limited to the above embodiment.

For example, the configuration and structure of the compositional elements of the ship propulsion device 1 are not limited to the above and can be suitably selected.

Figure 9:
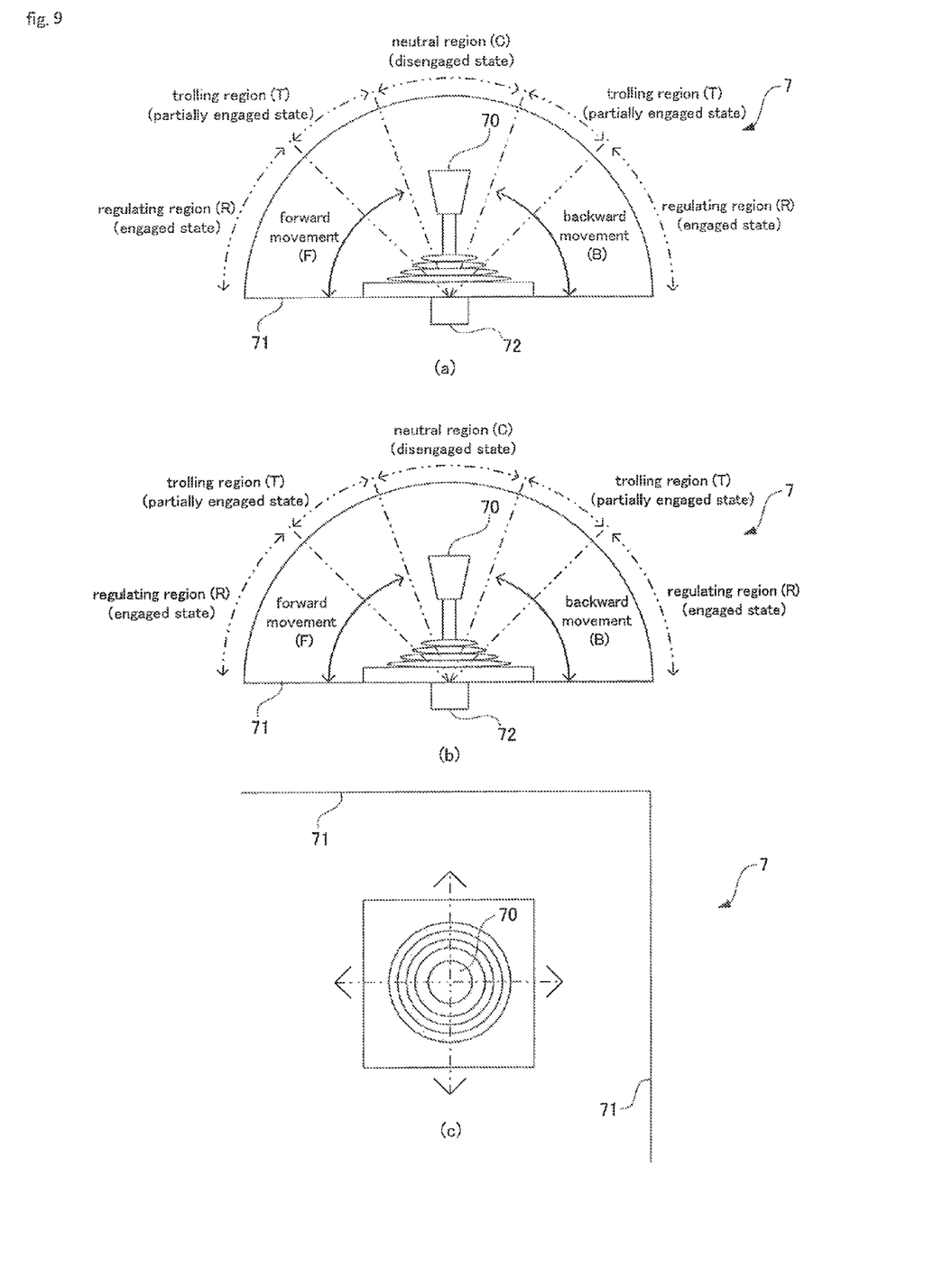
FIG. 9 schematically illustrates the construction of an input device according to another embodiment, wherein (a) is a front view, (b) is a side elevational view, and (c) is a top view.

In the above embodiment, the lever 70 of the input device 7 is designed so as to tilt to the right and left; however, the structure thereof is not limited to this. FIG. 9 schematically illustrates the construction of the input device according to another embodiment of the present invention, wherein FIG. 9(*a*) is a front elevational view, FIG. 9(*b*) is a side elevational view, and FIG. 9(*c*) is a top view thereof. In FIG. 9, the structural parts that are identical to those of FIG. 3 are given the same reference numerals, and their description is omitted. As shown in FIG. 9, the lever 70 of the input device 7 is structured so as to be tiltable not only rightward and leftward but also back and forth (in the vertical direction of FIG. 9). A known joystick lever may be used as a lever 70 having such a structure. In the input device 7, the input mechanism for tilting the lever 70 forward and backward is the same as that for tilting the lever 70 rightward and leftward; therefore, the description thereof is omitted. Having such a structure, input can be performed by tilting the lever 70 forward and backward or rightward and leftward.

In the above embodiment, when the rotational speed of the propeller 2 reached the target level, the speed of the engine 3 was returned from the second engine speed to the first engine speed. However, it is not always necessary to return it to the first engine speed, and there is no particular limitation to the engine speed that it is returned to as long as it is lower than the second engine speed. Therefore, instead of the first engine speed, it can be returned to another engine speed (a third engine speed) that is lower than the second engine speed.

The first engine speed can be suitably selected depending on the performance of the ship 10.

The second engine speed is not particularly limited and can be suitably selected as long as it is higher than the first engine speed.

In the above embodiment, the construction wherein the clutch 4 is put into the engaged state from the disengaged state through the partially engaged state is explained. However, when operating the ship propulsion device 1, it is not always necessary to go through the partially engaged state, and the clutch 4 can be switched immediately from the disengaged state to the engaged state. For example, when the lever 70 of the input device 7 is tilted, if the tilting is performed at a tilting speed faster than the preset speed, the clutch 4 may be designed to be immediately switched from the disengaged state to the engaged state without going through the partially engaged state. Similarly, when the clutch 4 is switched from the engaged state to the disengaged state, if the tilting speed of the lever 70 is fast, the switching may be performed by omitting the partially engaged state.

In order to adjust the input value of the input device 7 in conformance with the rotational speed of the propeller in the partially engaged state, based on the detection result of the rotational speed detection device 6, the partially engaged clutch 4 may be controlled using oil pressure.

Examples

An Example that rotates a propeller 2 using the ship propulsion device 1 of the present invention is shown below. The invention, however, is by no means limited to this Example. In the ship propulsion device 1 of the present invention, the first engine speed of the engine 3 was set to 500 rpm, and the speed reduction ratio of the transmission 5 was set to 2.0. Therefore, when the clutch 4 is in the engaged state, the speed (i.e., number of rotations) of the propeller 2 is 250 rpm (500 rpm/2.0).

In this case, in order to make the rotational speed of the propeller when the clutch is in the partially engaged state close to the rotational speed of the propeller when the clutch is in the engaged state, when the clutch 4 is in the partially engaged state and the slip ratio is approximately 0%, the rotational speed of the propeller 2 is preferably about 250 rpm.

When the engine 3 operates at the first engine speed (500 rpm) and the slip ratio of the clutch 4 is 0%, if the clutch 4 were able to transmit 100% of the revolutions of the engine 3 to the propeller 2, the rotational speed of the propeller would be 250 rpm (500 rpm/2.0×100%). However, in practice, it becomes difficult for the clutch 4 to transmit the revolutions of the engine 3 to the propeller 2 when the slip ratio is 0 to 10%. At times, only about 90% of the revolutions of the engine 3 can be transmitted to the propeller 2. In this case, because the clutch 4 can transmit only 90% of the revolutions, the rotational speed of the propeller becomes 225 rpm (500 rpm/2.0×90%).

In order to solve this problem, the second engine speed of the engine 3 was set to 560 rpm, and the speed of the engine was increased from the first engine speed (500 rpm) to the second engine speed (560 rpm) when the clutch 4 was in the partially engaged state. This increases the rotational speed of the propeller, even when the clutch 4 transmits only 90% of the engine revolutions to the propeller 2, enabling the rotational speed of the propeller to be about 250 rpm (560 rpm/2.0×90%) when the slip ratio is 0% and the clutch is in the partially engaged state.

Thereafter, the engine 3 was returned to the first engine speed (500 rpm) and the clutch 4 was engaged. At this time, the rotational speed of the propeller 2 was 250 rpm (500 rpm/2.0).

As described above, the ship propulsion device 1 of the present invention can make the rotational speed of the propeller (about 250 rpm) when the clutch is in the partially engaged state with a slip ratio of 0% close to the rotational speed of the propeller (250 rpm) when the clutch is in the engaged state.

EXPLANATION OF REFERENCE NUMERALS

1 ship propulsion device
2 propeller
3 engine
4 clutch
5 transmission
6 rotational speed detection device
7 input device
8 control device
10 ship

The invention claimed is:

1. A ship propulsion device comprising:
a propeller configured to propel a ship;
an engine configured to rotate the propeller;
a clutch configured to transmit revolutions of the engine to the propeller;
an input means configured to input a state of the clutch;
a rotational speed detection means configured to detect a rotational speed of the propeller; and
a control means configured to control operational speed of the engine and the state of the clutch, wherein
the control means operates the engine at a first engine speed when the clutch is an a disengaged state;
the control means, based on the input of the input means, changes the state of the clutch from the disengaged state to a partially engaged state and operates the engine at a second engine speed that is higher than the first engine speed;
the control means, based on a detected rotational speed of the propeller by the rotational speed detection means, operates the engine at an engine speed that is lower than the second engine speed; and
the control means, based on the input of the input means, changes the state of the clutch from the partially engaged state to an engaged state.

2. The ship propulsion device according to claim 1, wherein the control means returns the speed of the engine from the second engine speed to the first engine speed based on the detected rotational speed of the propeller by the rotational speed detection means.

3. The ship propulsion device according to claim 2, wherein the detected rotational speed of the propeller by the rotational speed detection means equals the first engine speed.

4. A ship propulsion device comprising:

a propeller propelling a ship in a predetermined direction;

an engine rotating the propeller;

an input device for inputting and switching between clutch states including a disengaged state, a partially engaged state and an engaged state;

a clutch transmitting rotational force of the engine to the propeller in one of the disengaged clutch state, the partially engaged clutch state and an engaged clutch state;

a rotational speed detection device detecting a rotational speed of the propeller; and a control device receiving a clutch state from the input device and a detected rotational speed of the propeller from the rotational speed detection device and controlling operational speed of the engine and the state of the clutch, wherein the control means is configured to:

operate the engine at a first engine speed when the input device designates the disengaged clutch state,     change the clutch state from the disengaged state to the partially engaged state when the input device is switched from the disengaged state to the partially engaged state and operate the engine at a second engine speed that is higher than the first engine speed,     operate the engine at an engine speed that is lower than the second engine speed when the detected rotational speed of the propeller equals a target speed, and     change the state of the clutch from the partially engaged state to the engaged state when the input device is switched from the partially engaged state to the engaged state.

5. The ship propulsion device according to claim 4, wherein the control device returns the speed of the engine from the second engine speed to the first engine speed when the detected rotational speed of the propeller equals the target speed.

6. The ship propulsion device according to claim 4, wherein the target speed equals the first engine speed.

* * * * *